United States Patent Office 2,849,438
Patented Aug. 26, 1958

2,849,438
WATER-INSOLUBLE MONOAZO DYESTUFFS

Gerd Muller, Koln-Flittard, Franz Bechlars and Herbert Detzner, Leverkusen, and Hartmut Grahmann, Koln-Riehl, Germany, assignors to Farbenfabriken Bayer Aktiengesellschaft, Leverkusen, Germany, a corporation of Germany No Drawing. Application June 27, 1956
Serial No. 594,097

Claims priority, application Germany July 20, 1955

5 Claims. (Cl. 260—204)

The present invention relates to water-insoluble monoazo dyestuffs and to a process for their manufacture; more particularly it relates to monoazo dyestuffs corresponding to the following formula:

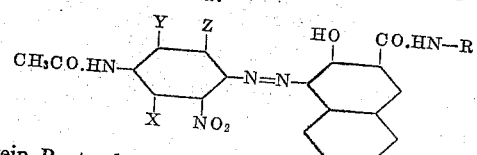

wherein R stands for a benzene radical which may be further substituted and X, Y and Z mean hydrogen, halogeno, alkyl, alkoxy or nitro groups.

It is an object of the present invention to provide new water-insoluble monoazo dyestuffs. It is a further object to provide water-insoluble monoazo dyestuffs with good fastness properties.

The new monoazo dyestuffs are obtainable by coupling in substance or on the fibre diazotized 1-amino-2-nitro-4-acetylamino-benzenes which may be further substituted in the benzene nucleus by halogen, alkyl, alkoxy or further nitro groups, with 2,3-hydroxynaphthoic acid anilides. The dyestuffs thus obtained are distinguished by their good solvent and light fastness. These properties make them excellently suitable for dyeing lacquers, such as nitro cellulose- and alkyd resin lacquers, and for dyeing oil paints, graphic printing, pigment printing and for the so-called spinning process.

The following examples are given for the purpose of illustrating the invention, without, however, limiting it thereto; the parts being by weight.

Example 1

19.5 parts of 1-amino-2-nitro-4-acetylamino-benzene are diazotized in usual manner. The solution obtained is treated with acetic acid and an alkyl sulfonate. 32.2 parts of 1-(2',3'-hydroxy-naphthylamino)-2-methoxybenzene in dilute soda lye are introduced with stirring. The acetic acid suspension obtained is heated to 40° C. until the coupling is complete. The resulting dyestuff is filtered, washed and dried. It corresponds to the formula:

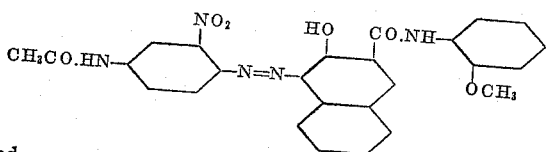

and represents a red-brown powder which dies lacquer incorporated therein maroon shade. The dyeings obtainable with such lacquer are distinguished by a very good fastness to light, to atmospheric influences and very good fastness to solvents. The dyestuff is also suitable for dyeing plastic masses or spinning solutions and for the preparation of printing dyes for textile printing and graphic printing.

Example 2

39.5 parts of 1-(2',3'-hydroxy-naphthoylamino)-2,4-dimethoxy-5-chloro-benzene are dissolved in dilute soda lye. After cooling the solution and adding an alkyl sulfonate the above said azo component is precipitated in finely divided form by addition of acetic acid. To this suspension a diazo salt solution is added with stirring which is obtainable in usual manner by diazotizing 19.5 parts of 1-amino-2-nitro-4-acetylaminobenzene. The mixture is heated to 40° C. for a short time whereby coupling is completed. The dyestuff thus obtained is filtered, washed and dried. It corresponds to the following formula:

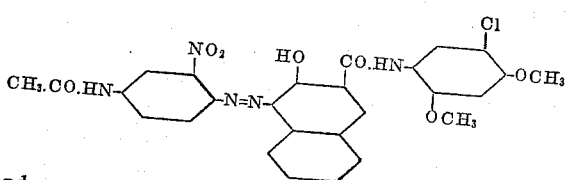

and represents a red-brown powder which is very good suitable in the same manner as stated in Example 1.

Example 3

22.9 parts of 1-amino-2-nitro-4-acetylamino-5-chloro-benzene are diazotized in usual manner and the solution obtained is treated with acetic acid and an alkyl sulfonate. Into this solution is introduced a solution of 20.4 parts of 1-(2',3'-hydroxy-naphthoylamino)-2-methylbenzene in dilute soda lye. The mixture is heated to 40° C. until coupling is complete. The resulting dyestuff is filtered with suction and dried. It corresponds to the formula:

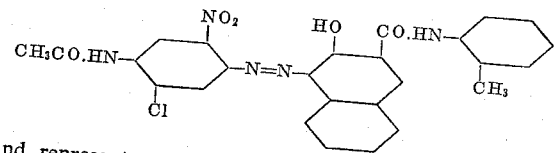

and represents a brown powder which is distinguished by a very good solvent fastness.

The dyestuff can be used to prepare a graphic printing; it yields a red-brown print with very good light fastness.

If, instead of 1-amino-2-nitro-4-acetylamino-5-chloro-benzene, equivalent parts of 1-amino-2-nitro-4-acetyl-amino-5-methoxybenzene are used, a dyestuff is obtained which yields graphic prints of maroon shades with good fastness properties.

Example 4

20.9 part of 1-amino-2-nitro-4-acetylamino-5-methyl-benzene are diazotized and to the diazo salt solution obtained is added acetic acid and an alkyl sulfonate. A solution of 30.4 parts of 1-(2',3'-hydroxy-naphthoyl-amino)-2-methylbenzene in dilute soda lye is introduced and the mixture is heated to 40° C. The dyestuff thus obtained is filtered with suction and dried. It corresponds to the following formula:

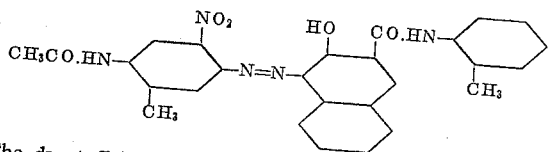

The dyestuff is distinguished by a very good fastness to solvents. The dyestuff can be used to prepare a graphic print; it yields an orange colored print with very good light fastness.

We claim:
1. A water-insoluble monoazo dyestuff corresponding to the following formula:

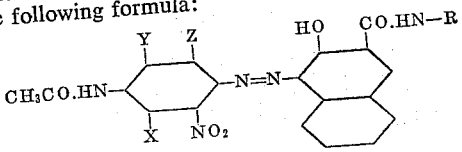

wherein R is a member selected from the group consisting of phenyl, halo-substituted phenyl, lower alkyl-substituted phenyl, and lower-alkoxy-substituted phenyl, and X, Y and Z stand for a member selected from the group consisting of hydrogen, chlorine, lower alkyl, lower alkoxy and nitro radicals.

2. The water-insoluble monoazo dyestuff corresponding to the formula:

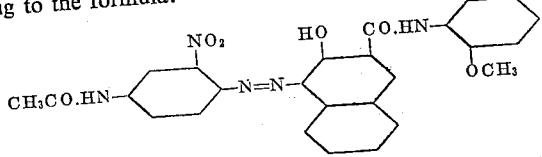

3. The water-insoluble monoazo dyestuff corresponding to the formula:

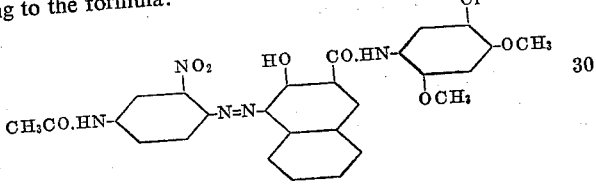

4. The water-insoluble monoazo dyestuff corresponding to the formula:

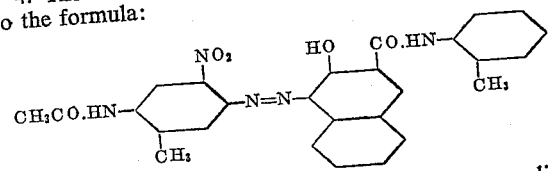

5. The water-insoluble monoazo dyestuff corresponding to the formula:

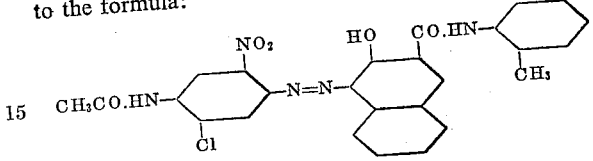

References Cited in the file of this patent

UNITED STATES PATENTS 2,025,117    Lubs et al.  --------------- Dec. 24, 1935
2,218,920    Morschel et al.  ---------- Oct. 22, 1940

OTHER REFERENCES

Journal Chem. Soc. (London), 1928, pages 172–177.
Heilbron: Dictionary of Organic Compounds III, page 765.